(12) United States Patent
Hills et al.

(10) Patent No.: US 10,322,485 B2
(45) Date of Patent: *Jun. 18, 2019

(54) METHODS FOR POLISHING FLOORING SURFACES

(71) Applicant: Advanced Concrete Technologies LLC, Orem, UT (US)

(72) Inventors: Dal N. Hills, Midway, UT (US); Kent Barrus, Provo, UT (US)

(73) Assignee: Advanced Concrete Technologies LLC, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,366

(22) Filed: Sep. 19, 2017

(65) Prior Publication Data

US 2018/0001430 A1    Jan. 4, 2018

Related U.S. Application Data

(60) Continuation of application No. 14/988,660, filed on Jan. 5, 2016, now Pat. No. 9,764,440, which is a continuation of application No. 14/169,299, filed on Jan. 31, 2014, now Pat. No. 9,228,094, which is a division of application No. 13/613,057, filed on Sep. 13, 2012, now Pat. No. 8,680,185, which is a continuation of application No. 13/016,756, filed on Jan. 28, 2011, now Pat. No. 8,299,151.

(60) Provisional application No. 61/299,882, filed on Jan. 29, 2010.

(51) Int. Cl.
| | | |
|---|---|---|
| B24B 1/00 | (2006.01) |
| C09D 133/08 | (2006.01) |
| E04F 15/08 | (2006.01) |
| C09D 7/61 | (2018.01) |
| C09D 7/63 | (2018.01) |
| C08K 3/34 | (2006.01) |
| C08K 5/54 | (2006.01) |

(52) U.S. Cl.
CPC ............... B24B 1/00 (2013.01); C09D 7/61 (2018.01); C09D 7/63 (2018.01); C09D 133/08 (2013.01); E04F 15/08 (2013.01); C08K 3/34 (2013.01); C08K 5/54 (2013.01); Y10T 428/31663 (2015.04)

(58) Field of Classification Search
CPC ......... B24B 1/00; E04F 15/08; C09D 133/08; C09D 7/1233; C09D 7/1216; C08K 5/54; C08K 3/34; Y10T 428/31663
USPC ...................................................... 524/145
See application file for complete search history.

(56) References Cited

U.S. PATENT DOCUMENTS

| | | |
|---|---|---|
| 4,376,175 A | 3/1983 | Posten |
| 5,998,525 A | 12/1999 | Wang et al. |
| 6,454,632 B1 | 9/2002 | Jones et al. |
| RE38,364 E * | 12/2003 | Wetherell ............ C04B 41/5089 407/78 |
| 8,088,216 B2 | 1/2012 | Kishimoto |
| 8,852,334 B1 | 10/2014 | Hills et al. |
| 2005/0031790 A1 | 2/2005 | Jackson et al. |
| 2006/0180307 A1 | 8/2006 | Slabaugh et al. |
| 2011/0079246 A1* | 4/2011 | Collazo-Martinez ..... B08B 7/00 134/6 |

* cited by examiner

*Primary Examiner* — Hui H Chin

(74) *Attorney, Agent, or Firm* — Durham Jones & Pinegar, P.C., Intellectual Property Law Group

(57) ABSTRACT

A method for treating a surface of flooring includes applying a composition that includes a silicate to a surface of the flooring and, while the composition is present on the surface, polishing or burnishing the surface. The silicate may be a lithium polysilicate and/or a colloidal silica. The composition may further include a surfactant and/or a leveling agent. When the composition is applied to the surface of the flooring, gravity may enable it to spread substantially evenly across the surface. The acts of applying and polishing or burnishing may be repeated. Such a treatment may result in a surface that has a glossiness of at least 80, as measured by a gloss meter set to a 60° angle of incidence.

19 Claims, No Drawings

METHODS FOR POLISHING FLOORING SURFACES

CROSS-REFERENCE TO RELATED APPLICATION

This application is a continuation of U.S. patent application Ser. No. 14/988,660, filed on Jan. 5, 2016 and titled "METHODS FOR POLISHING INORGANIC SUBSTRATES" (hereinafter "the '660 Application"), now U.S. Pat. No. 9,764,440, issued on Sep. 19, 2017, which is a continuation of U.S. patent application Ser. No. 14/169,299, filed on Jan. 31, 2014 and titled "PROTECTIVE COATINGS FOR INORGANIC SUBSTRATES AND COATED INORGANIC SUBSTRATES" (hereinafter "the '299 Application"), now U.S. Pat. No. 9,228,094, issued on Jan. 5, 2016, which is a divisional of U.S. patent application Ser. No. 13/613,057, filed on Sep. 13, 2012 and titled "PROTECTIVE COATINGS FOR INORGANIC SUBSTRATES AND COATED INORGANIC SUBSTRATES" (hereinafter "the '057 Application"), now U.S. Pat. No. 8,680,185, issued on Mar. 25, 2014, which is a continuation of U.S. patent application Ser. No. 13/016,756, filed on Jan. 28, 2011 and titled "PROTECTIVE COATINGS FOR INORGANIC SUBSTRATES AND ASSOCIATED METHODS" (hereinafter "the '756 Application"), now U.S. Pat. No. 8,299,151, issued on Oct. 30, 2015, which claims the benefit of priority under 35 U.S.C. § 119(e) to the Jan. 29, 2010 filing date of U.S. Provisional Patent Application No. 61/299,882, titled "PROTECTIVE COATINGS FOR INORGANIC SUBSTRATES AND ASSOCIATED METHODS" (hereinafter "the '882 Application"). The entire disclosures of the '660 Application, the '299 Application, the '057 Application, the '882 Application and the '756 Application are, by this reference, hereby incorporated herein.

TECHNICAL FIELD

The present invention, in various embodiments, relates generally to compositions and methods for protecting and polishing substrates and, more specifically, to compositions that include a silicate, such as an alkali metal polysilicate (e.g., lithium polysilicate, etc.) or a colloidal silica. In particular, the present invention relates to compositions that include a silicate and one or more siliconates, or organosiliconates, as well as to the application of such compositions to flooring surfaces. In a specific embodiment, the present invention relates to a composition that includes lithium polysilicate and a siliconate, such as a metal siliconate or, even more specifically, an alkali metal siliconate. Such a composition may, in some embodiments, be applied to flooring surfaces, in connection with polishing or burnishing the flooring surfaces.

RELATED ART

Use of Alkali Metal Silicates on Inorganic Substrates

Alkali metal silicates, such as potassium polysilicate and sodium polysilicate, have long been used to protect, harden, and polish inorganic substrates, such as cement. When applied to an inorganic substrate, alkali metal silicates react with free lime (calcium oxide, calcium hydroxide) in the inorganic substrate to prevent the surface of the inorganic substrate from becoming porous, or to reduce porosity at the surface of the inorganic substrate.

Over recent years, lithium poly silicates, which are also known in the art as "lithium silicates," have found widespread use in a variety of compositions that are formulated for application to inorganic substrates, such as concrete, masonry, and stone. Compositions that include lithium silicates may be formulated for a variety of purposes, including to protect, densify or harden, and/or polish the inorganic substrates to which they are applied.

The ever-increasing use of lithium silicate in connection with inorganic substrates has been due, in part, to its superior performance in penetrating and reacting with inorganic substrates when compared with other alkaline metal polysilicates, such as potassium polysilicates and sodium polysilicates. Among other things, lithium silicate is less alkaline (i.e., has a lower pH) than other alkaline metal silicates, which protects the substrate from undesirable reactions and improves the stability of the substrate. It has also been found that lithium silicate penetrates more quickly and further into inorganic substrates than other alkali metal silicates (possibly due to its smaller size than other alkaline metal polysilicates), further enhancing the ability of lithium silicate to protect the inorganic substrates to which it is applied against staining and deterioration (such as that caused by wear, dusting, sweating, efflorescence, scaling, surface alkali silica reaction (ASR), damaging alkalis, etc.).

While alkali metal silicates protect the surfaces of inorganic substrates by hardening and densifying the surfaces to which they are applied, they are typically not used to seal the surfaces of the substrates to which they are applied. Instead, thicker polymeric coatings are used for that purpose. While polymeric coatings on inorganic flooring surfaces provide protection for extended periods of time and may initially increase glossiness, they are scuffed and scratched over time, particularly in high traffic areas.

Alternatively, or in addition to a polymeric coating, inorganic floor surfaces may be protected by use of a wax, particularly when a high gloss finish is desired. When wax is applied to an inorganic floor surface, it is typically applied in several (e.g., three to seven) relatively thick coats. But, like any other protective coating, when subjected to traffic, the protective coating that has been formed by the wax is scratched and scuffed.

As the number of scratches and scuffs in any protective coating increases, the gloss of the protective coating decreases. In order to maintain the desired level of glossiness, the protective coating must be periodically burnished, which consumes significant amounts of time. When a wax is used to protect the inorganic flooring surface, periodic burnishing requires the use of organic solvents, such as butoxy ethanol, which are often harmful to the environment, as well as to the persons who use such solvents. In some settings, wax coatings are burnished on a daily basis, requiring significant time and resources (e.g., burnishing pads, butoxy ethanol, etc.).

In addition to the undesired maintenance that wax and other protective coatings require, they must also be stripped and replaced periodically. In high traffic settings, such as stores, schools, and hospitals, wax protective coatings on floors are often stripped and replaced every six to eight weeks. Due to their thicknesses, wax protective coatings must be stripped to prevent undesired buildup of the wax. Stripping requires the use of hazardous organic solvents, such as butoxy ethanol, and consumes a great deal of time, as the old wax must be collected and discarded. Frequent reapplication of wax protective coatings also consumes valuable time and resources (e.g., wax, burnishing pads, etc.).

SUMMARY

The present invention includes compositions for protecting inorganic substrates, such as concrete, terrazzo, and ceramic tile floors. In addition, the present invention includes methods for protecting exposed surfaces of inorganic substrates.

As used herein, the term "protect," when used in reference to an inorganic substrate, includes, but is not limited to, hardening, densifying, and at least partially sealing the inorganic substrate. Additionally, "protection" of an inorganic substrate may include polishing a surface of the inorganic substrate.

Various embodiments of compositions that incorporate teachings of the present invention include water, a silicate, such as an alkali metal polysilicate (e.g., lithium polysilicate, potassium polysilicate, sodium polysilicate, etc.) or a colloidal silica and a siliconate, such as a metal siliconate or, in some more specific embodiments, an alkali metal siliconate (e.g., sodium methyl siliconate, potassium methyl siliconate, etc.), along with acrylic latex, a silane coupling agent (e.g., an epoxysilane, such as N-β(aminoethyl)-r-aminopropyl-trimethoxysilane, etc.), a solvent (e.g., a glycol solvent, such as ethylene glycol monobutyl ether, etc.), and an optional leveling agent. The leveling agent may comprise a surfactant (e.g., a fluorosurfactant, etc.) or an organic leveling agent (e.g., a silicone leveling agent, etc.). The components of a composition that incorporates teachings of the present invention are, in some embodiments, dispersed throughout the composition. In some embodiments, one or more of the components may be present in solution.

In another aspect, the present invention includes embodiments of methods for blending compositions that are useful for protecting inorganic substrates. One specific embodiment of such a method includes blending a surfactant and/or leveling agent into water, adding a solvent and/or silane coupling agent to the mixture, then adding a silane, a silicate, a siliconate, and acrylic latex. Another embodiment of a method for compounding a composition of the present invention includes mixing water and a solvent, optionally adding a surfactant to that mixture, then adding a silane coupling agent, a silicate, a siliconate, and then acrylic latex.

The present invention also includes various embodiments of methods for protecting inorganic substrates. In such embodiments, an embodiment of a composition according to the present invention is applied to the inorganic substrate. A composition of the present invention may be sprayed onto a surface of the inorganic substrate and/or spread onto the surface of the inorganic substrate (e.g., with a microfiber mop, etc.). The surface of the inorganic substrate, with the composition thereon, may then be burnished in a manner known in the art (e.g., with a diamond-impregnated pad, etc.).

In a specific embodiment, an embodiment of a composition of the present invention is applied to a surface of an inorganic substrate, such as the surface of a concrete, terrazzo, or ceramic tile floor. The composition may be sprayed and spread onto the surface of the inorganic substrate. The surface of the inorganic substrate may then be burnished. The application and burnishing processes may be repeated at least once. Such a process may protect the surface of the inorganic substrate, as well as provide it with a polished finish.

Other aspects of the present invention, as well as features and advantages of various aspects of the present invention, will become apparent to those of ordinary skill in the art through consideration of the ensuing description and the appended claims.

DETAILED DESCRIPTION

The present invention includes compositions for protecting the surfaces of inorganic substrates. In some embodiments, compositions of the present invention may also impart inorganic substrate surfaces with a polished finish. One embodiment of such a composition includes water, a silicate, acrylic latex, an alkaline metal methyl siliconate, a silane coupling agent, and a solvent.

The following table lists various components that may be included in various embodiments of a composition according to the present invention, as well as possible amounts of each component of such a composition:

| Component | Percent (weight/weight) Range | Percent (weight/weight) (Specific Embodiment) |
|---|---|---|
| Water | Balance | 68.95 |
| Solvent (e.g., Ethylene Glycol Monobutyl Ether, Dipropylene Glycol Dimethyl Ether, Dipropylene Glycol n-Butyl Ether, etc.) | 0.25-1 | 0.5 (Ethylene Glycol Monobutyl Ether) |
| Leveling Agent (e.g., Fluoro Surfactant, Silicone Leveling Agent, Trialkyl Phosphate, etc.) | 0.05-1 | 0.05 (Silicone Leveling Agent) |
| Silane Coupling Agent (e.g., N-β (aminoethyl)-r-aminopropyl-trimethoxysilane, etc.) | 0.5-2.5 | 2.0 |
| Silicate (e.g., Lithium Polysilicate, etc.) | 10-25 | 16.0 |
| Alkali Metal Methyl Siliconate (e.g., Potassium Methyl Siliconate, etc.) | 1-7.5 | 2.5 |
| Acrylic Latex | 4-25 | 10.0 |

All weight percentages in the preceding table and elsewhere throughout this disclosure account for the total weight of each component, including water.

While other components may be included in some embodiments of a composition that incorporates teachings of the present invention, other embodiments consist essentially of water, a silicate, acrylic latex, a siliconate, a silane coupling agent, and a solvent, with the surfactant being a non-essential component. In other embodiments, a composition of the present invention consists of water, a silicate, acrylic latex, a siliconate, a silane coupling agent, and a solvent, while a surfactant, such as a fluorosurfactant, may be required in still other embodiments of a composition of the present invention.

In various embodiments, the solvent of a composition of the present invention may be a glycol solvent, such as ethylene glycol monobutyl ether. Ethylene glycol monobutyl ether is also known as "2-butoxyethanol" and as "Glycol Ether EB." It has the molecular chemical formula $C_6H_{14}O_2$ and the chemical structure $CH_3CH_2CH_2CH_2OCH_2CH_2OH$. Ethylene glycol monobutyl ether is a solvent for a variety of resins, including, without limitation, acrylic resins. As a solvent, ethylene glycol monobutyl ether enhances wettability of a composition of the present invention. Ethylene glycol monobutyl ether is available from a variety of sources, including the Dow Chemical Company of Midland, Mich.; Eastman Chemical Company of Kingsport, Tenn.; and Lyondell Chemical Company of Houston, Tex.

Other examples of solvents that may be used in various embodiments of compositions according to the present invention include, but are not limited to, dipropylene glycol dimethyl ether and dipropylene glycol n-butyl ether. Dipropylene glycol dimethyl ether has the chemical formula $CH_3OCH_2CH(CH_3)OCH_2CH(CH_3)OCH_3$ (major isomer). The Dow Chemical Company sells dipropylene glycol dimethyl ether under the trademark PROGLYDE™ DMM. The chemical formula of dipropylene glycol n-butyl ether is $C_4H_9O[CH_2CH(CH_3)O]_2H$ (major isomer). Dipropylene glycol n-butyl ether is available from The Dow Chemical Company under the trademark DOWANOL® DPnB.

A silane coupling agent of a composition of the present invention may have at least two reactive groups of different types bonded to a silicon atom in the molecule. One of the reactive groups (e.g., a methoxy group ($-OCH_3$), an ethoxy group ($-OCH_2CH_3$), a silanic hydroxyl group ($-SiOH$), etc.) is reactive with an inorganic material, while another of the reactive groups (e.g., a vinyl group ($-CH=CH_2$), an epoxide (in which an oxygen atom is covalently bonded to two adjacent, covalently bonded carbon atoms, forming a three-member ring), a methacryl group ($CH_2=C(CH_3)C(O)-$), an amino group ($-NH_2$), a thiol or mercapto group ($-SH$), etc.) is reactive with an organic material. These two reactive groups of the silane coupling agent bind inorganic components (e.g., the silicate, etc.) and organic components (e.g., the siliconate, etc.) of a composition of the present invention to each other. It is also believed that the two reactive groups of the silane coupling agent enhance adhesion of a composition of the present invention to an inorganic substrate. In addition to its binding and potential adhesive properties, the silane coupling agent may serve as a sealant and/or as a water repellant.

In a specific embodiment, the silane coupling agent of a composition of the present invention may comprise or consist of an aminoethyl aminopropyl trimethoxy silane ($C_8H_{22}N_2O_3Si$), which is known by the chemical names N-β(aminoethyl)-r-aminopropyl-trimethoxysilane, [3-(2-Aminoethyl)aminopropyl]trimethoxysilane, and N-[3-(Trimethoxysilyl)propyl]ethylenediamine. Such a material is available from Dow Corning Corporation of Midland, Mich., as Z-6020, as well as from a variety of other sources.

The silicate of various embodiments of a composition of the present invention comprises an alkali metal silicate, such as lithium polysilicate. In alternative embodiments, the silicate may include an alkali metal polysilicate, such as potassium polysilicate and/or sodium polysilicate, and/or a colloidal silica in place of or in addition to the lithium polysilicate. Silicates are available from a variety of sources. For example, Grace Davison, a subsidiary of the Grace Performance Chemicals division of W.R. Grace & Co. of Columbia, Md., sells lithium polysilicate under the trade name LUDOX®. Various silicates are also manufactured by PQ Corporation of Malvern, Pa.

Silicates, which are inorganic materials, may impart a cured or solidified form of a composition of the present invention (e.g., a coating, etc.) with a desired hardness, which may further prevent abrasion or impact damage to the inorganic substrate. Silicates may also chemically react with components of some inorganic substrates to further enhance the hardness that the silicates otherwise provide. As an example, silicates may chemically react with various materials of inorganic substrates, such as the free lime within concrete.

In addition to imparting a composition of the present invention with hardness, a silicate may provide some water repellency, as well as minimize or eliminate corrosion of an inorganic substrate to which the composition is applied (e.g., on which a coating that comprises a cured or solid form of the composition is formed, etc.).

Further water repellency may be provided by the siliconate of a composition of the present invention. In some embodiments, the siliconate may comprise a metal siliconate, such as an alkali metal siliconate (e.g., potassium methyl siliconate and/or sodium metal siliconate, etc.) all of which are manufactured by Dow Corning. In a specific embodiment, the siliconate of a composition of the present invention consists of the potassium methyl siliconate available from Dow Corning as XIAMETER® 0777. In such embodiments, the composition lays out, or spreads, well. Thus, there may be no need for a leveling agent (e.g., a fluorosurfactant, etc.) in such embodiments.

Acrylic latex is an emulsion of an acrylic polymer in water. In a composition of the present invention, acrylic latex may facilitate adhesion of the composition to an inorganic substrate. In a specific embodiment, the acrylic latex may have a solids content of about 47% to about 49%, such as the PLIOTEC® PA90 acrylic latex available from Eliokem of Villejust, France. Another example of a latex that may be used in various embodiments of compositions according to the present invention is AVANSE™ MV-100 from The Dow Chemical Company.

In embodiments of compositions that include surfactants, nonionic fluorinated surfactants, or "fluorosurfactants," may be used. Fluorosurfactants are more effective than ionic (hydrocarbon) surfactants at reducing the surface tension of water and, thus, the surface tension of a composition in which they are included. The reduced surface tension of a composition that includes one or more fluorosurfactants may facilitate wetting of a substrate surface with the composition, as well as spreading and leveling of the composition on the surface of the substrate. The inclusion of a fluorosurfactant in a composition of the present invention may also enable a composition of the present invention to penetrate smaller voids in a substrate than may be penetrated by embodiments of compositions that lack fluorosurfactants (i.e., that include other types of surfactants or that lack surfactants). A specific embodiment of a composition of the present invention includes the fluorosurfactant marketed as MASURF® FS-120A by Mason Chemical Company of Arlington Heights, Ill. In another specific embodiment, a composition of the present invention may include a fluorosurfactant and comprise a short chain molecule (e.g., four carbon atoms, etc.), such as the perfluorobutanesulfonic acid-based fluorosurfactants marketed by 3M of St. Paul, Minn., under the trade name NOVEC™.

As an alternative to a surfactant, or in addition thereto, a composition according to the present invention may include a leveling agent of a type known in the art. Like surfactants, leveling agents enable a composition of the present invention to wet and smoothly coat a substrate and, in the case of substrates that are formed from porous materials, to penetrate the substrate. One example of a leveling agent is the silicon leveling agent available from Dow Corning under the trade name DOW CORNING® 2-9034 Emulsion. Another example of a leveling agent is trialkyl phosphate, such as the tris(2-butoxyethyl) phosphate having the chemical formula $C_{18}H_{39}O_7P$ available from Chemtura Corporation of Philadelphia, Pa., as KRONITEX® KP-140 ("KP-140").

In addition to acting as a leveling agent, KP-140 may reduce or eliminate foaming as a composition that incorporates teachings of the present invention is compounded and/or used. When relatively small amounts (e.g., less than about 0.3% w/w, about 0.2% w/w, about 0.1% w/w, etc.) of KP-140 are used in a composition of the present invention, the composition may harden more quickly than, and may reduce soiling better than, compositions that include relatively large amounts (e.g., about 0.3% w/w, more than about 0.3% w/w, etc.) of KP-140.

The following EXAMPLES identify components of some additional specific embodiments of compositions that incorporate teachings of the present invention.

EXAMPLE 1

| Component | Percent (weight/weight) |
|---|---|
| Water | 39.99 |
| Dipropylene Glycol n-Butyl Ether (e.g., DOWANOL ® DPnB from The Dow Chemical Company) | 1.00 |
| Silane (e.g., DOW CORNING Z-6020 ® from Dow Corning Corporation) | 3.81 |
| Lithium polysilicate | 30.20 |
| Potassium Methyl Siliconate | 5.00 |
| Latex (e.g., AVANSE ™ MV-100 from The Dow Chemical Company) | 20.00 |

The composition of EXAMPLE 1 may be applied directly to an inorganic substrate or it may comprise a concentrate that may be diluted with water before application to an inorganic substrate. In a specific embodiment where the composition of EXAMPLE 1 comprises a concentrate, it may be diluted with water at a ratio of 1:1, by weight or volume, before application to an inorganic substrate. The resulting diluted composition hardens quickly (more quickly than the composition of EXAMPLE 3), but it takes about twenty-four (24) hours to about thirty-six (36) hours from application and drying on the surface of an inorganic substrate before the resulting film and, thus, the surface of the substrate resists standing water.

EXAMPLE 2

| Component | Percent (weight/weight) |
|---|---|
| Water | 53.364 |
| Trialkyl Phosphate (e.g., KRONITEX ® KP-140 from Chemtura Corporation) | 0.3 |
| Dipropylene Glycol n-Butyl Ether (e.g., DOWANOL ® DPnB from The Dow Chemical Company) | 0.7 |
| Silane (e.g., DOW CORNING Z-6020 ® from Dow Corning Corporation) | 1.916 |
| Lithium polysilicate | 16.32 |
| Potassium Methyl Siliconate | 2.4 |
| Latex (e.g., AVANSE ™ MV-100 from The Dow Chemical Company) | 25.0 |

When the composition of EXAMPLE 2 is applied to an inorganic substrate, it may resist standing water within about thirty (30) minutes after it has dried. The composition of EXAMPLE 2 flows and levels on the surfaces of inorganic substrates better than the composition of EXAMPLE 1, with less streaking than the composition of EXAMPLE 1, making the composition of EXAMPLE 2 easier to apply than the composition of EXAMPLE 1. It remains relatively soft for about four (4) or five (5) days, however.

In another aspect, the present invention includes embodiments of methods for blending compositions that are useful for protecting inorganic substrates. One specific embodiment of such a method includes mixing water and a solvent, optionally adding a leveling agent to that mixture, then adding a silane coupling agent, a silicate, a siliconate, then acrylic latex. In an even more specific embodiment, the surfactant and/or leveling agent may be "sweated" into the water. Sweating may include mixing using high shear agitation, in a manner known in the art. Sweating may be effected for a sufficient period of time for the surfactant and/or leveling agent to be completely dissolved and/or homogeneously dispersed throughout the water. In some embodiments, the surfactant and/or leveling agent may be sweated into the water for a period of about thirty (30) minutes. In embodiments where a solvent is used, the solvent may also be sweated into the water and into any previously included component (e.g., a surfactant, a leveling agent, etc.). As with sweating a surfactant and/or a leveling agent into water, the process of sweating a solvent into water or an aqueous solution or suspension may include mixing or agitation, and may be effected for a sufficient duration to enable the solvent to completely dissolve and/or be homogeneously dispersed throughout the water.

In addition, the present invention includes methods for protecting inorganic substrates. An embodiment of a composition according to the present invention may be applied to the surface of an inorganic substrate (e.g., by spraying, etc.) then spread (e.g., with a microfiber mop, etc.). The composition may be applied in one coat or in a plurality of coats.

In some embodiments, the surface of the inorganic substrate, with the composition thereon, may then be polished or burnished in a manner known in the art (e.g., with a diamond-impregnated pad, etc.). In embodiments where more than one coat of the composition is to be applied to a substrate, the surface to which the composition is applied (and the composition on that surface) may be polished or burnished after each application.

In a specific embodiment, a composition of the present invention is applied to a surface of an inorganic substrate (e.g., concrete, terrazzo, ceramic tile, etc.). The composition may be sprayed and/or spread onto the surface of the inorganic substrate. The surface of the inorganic substrate may then be burnished, particularly where the inorganic substrate comprises a floor. The application and/or burnishing processes may be repeated at least once. Such a process may protect the surface of the inorganic substrate, as well as provide it with a polished finish.

When such a process is employed, each layer of the coating may have a thickness of about 5 μm to about 6 μm or less, which may be significantly thinner than a layer of wax. The glossiness of the coating, which may be measured with a gloss meter of a type known in the art in terms of light reflected at an angle of incidence of 60° on a surface of the substrate, may be up to about 80% or more.

When applied to a floor that is subjected to moderate to heavy levels of traffic, a coating of a composition of the present invention may have a useful life of at least six months, and may last for as long as two years or more, as opposed to a useful life for wax of about six weeks with frequent (e.g., daily, weekly, etc.) burnishing in high traffic areas. Due to its hardness, a coating of the present invention may retain its shine and exhibit little or no wear over the life of the coating. If desired, however, a coating of the present invention may be burnished from time to time, without the requirement of environmentally unfriendly chemicals, such as the butoxy ethanol that is typically used when waxed flooring surfaces are burnished.

At the end of its useful life, a coating of the present invention need not be stripped from the surface of an inorganic substrate, as is required when wax is used. Due to the thickness (or, rather, thinness) of the worn coating(s), another coating may simply be applied atop the worn coating(s). When such a technique is used, the new coating will have substantially the same appearance (e.g., glossiness, etc.) as the original coating. By eliminating the need to strip the worn coating, the use of environmentally unfriendly chemicals is avoided, as is the mess (e.g., clumps of old wax, etc.) that is typically associated when conventional protective coatings are stripped from substrates (e.g., waxes from floors, etc.).

Although the foregoing description contains many specifics, these should not be construed as limiting the scope of the present invention, but merely as providing illustrations of some embodiments. Similarly, other embodiments of the invention may be devised which do not exceed the scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

What is claimed:

1. A method for treating a flooring surface, comprising:
    applying a composition including a silicate to the flooring surface; and
    with the composition on the flooring surface, providing a polished finish on the flooring surface, the composition capable of imparting the flooring surface with a glossiness of at least about 80, as measured by a gloss meter set to a 60° angle of incidence.

2. The method of claim 1, wherein applying the composition comprises applying a composition in which the silicate comprises a lithium silicate.

3. The method of claim 1, wherein applying the composition comprises applying a composition in which the silicate comprises a colloidal silica.

4. The method of claim 1, wherein applying the composition comprises applying a composition further including a silane coupling agent and an organic component.

5. The method of claim 4, wherein applying the composition comprises applying a composition in which the organic component comprises a siliconate.

6. The method of claim 4, wherein applying the composition comprises applying a composition further including an acrylic latex.

7. The method of claim 1, wherein applying the composition comprises applying a composition further including an acrylic latex.

8. The method of claim 1, wherein applying the composition comprises applying a composition further including a surfactant.

9. The method of claim 8, wherein applying the composition comprises applying a composition in which the surfactant is a leveling agent.

10. The method of claim 1, wherein applying the composition comprises applying a composition further including a leveling agent.

11. The method of claim 1, further comprising:
    repeating the applying and the providing the polished finish at least once.

12. The method of claim 1, wherein applying the composition comprises applying the composition to a surface of terrazzo, ceramic tile, or stone.

13. A method for providing a polished finish on a flooring surface, comprising:
    applying a composition including a silicate, a silane coupling agent, and a siliconate to the flooring surface;
    forming a layer of a coating on the flooring surface, the layer having a thickness of 6 µm or less.

14. The method of claim 13, comprising repeating the applying and the forming to form another layer of the coating on the flooring surface, the another layer having a thickness of 6 µm or less.

15. The method of claim 13, wherein the applying and the forming increases a glossiness of the flooring surface.

16. The method of claim 15, wherein the applying and the forming imparts the flooring surface with a glossiness of at least about 80, as measured by a gloss meter set to a 60° angle of incidence.

17. The method of claim 13, wherein applying the composition comprises applying a composition further including an acrylic latex.

18. A method for providing a polished finish on a flooring surface, comprising:
    applying a composition including a silicate, a silane coupling agent, a siliconate, and an acrylic latex to the flooring surface;
    forming a layer of a coating on the flooring surface, the layer having a thickness of 6 µm or less.

19. The method of claim 18, comprising repeating the applying and the forming to form another layer of the coating on the flooring surface, the another layer having a thickness of 6 µm or less.

* * * * *